Feb. 7, 1950 — N. POLANCO — 2,496,408
CAMERA DIAPHRAGM OPERATING ATTACHMENT
Filed Sept. 19, 1947
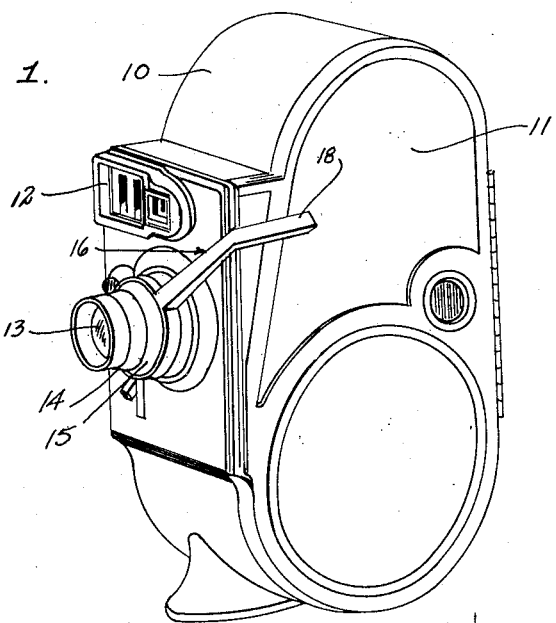
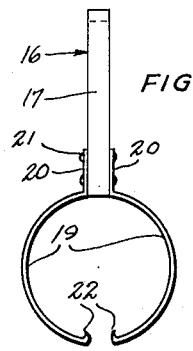
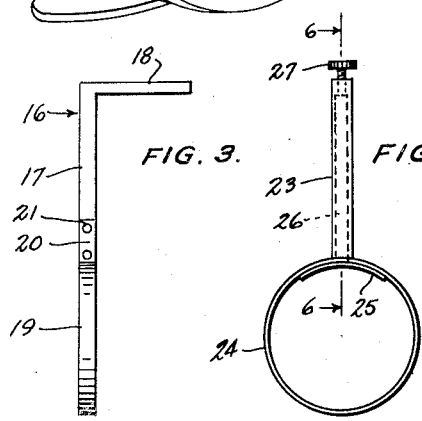
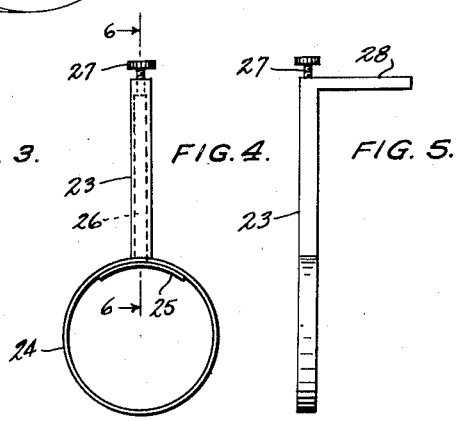
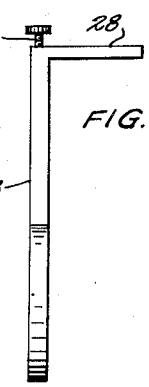
INVENTOR.
NICHOLAS POLANCO,
BY
McMorrow, Berman + Davidson
ATTORNEYS.

Patented Feb. 7, 1950

2,496,408

UNITED STATES PATENT OFFICE 2,496,408

CAMERA DIAPHRAGM OPERATING ATTACHMENT

Nicholas Polanco, Miami, Fla.

Application September 19, 1947, Serial No. 774,958

1 Claim. (Cl. 95—64)

This invention relates to improvements in attachments for motion picture cameras, and more particularly to an improved attachment for varying the light stop opening in the lens diaphragm of an amateur type motion picture camera to fade in and fade out scenes while the camera is in operation.

It is among the objects of the invention to provide a simplified, light weight attachment which is economical to manufacture, can be quickly and easily attached to a modern camera lens mounting without requiring any modification of the lens mounting or the camera, which lies within the dimensional limits of the camera to an extent such that it does not interfere with placing the camera in a carrying case and does not project in a manner to accidentally engage the clothing of a person carrying the camera, or other objects near the camera, and which affords a positive stop for the diaphragm opening by contacting a side of the camera at one limiting position thereof.

Other objects and advantages will become apparent from a consideration of the following description in conjunction with the accompanying drawing, wherein:

Figure 1 is a perspective view of an amateur-type motion picture camera showing an attachment illustrative of the invention operatively attached thereto;

Figure 2 is a front elevation of the attachment illustrated in Figure 1;

Figure 3 is a side elevation of the attachment illustrated in Figure 1;

Figure 4 is a front elevation of a somewhat modified form of camera attachment illustrative of the invention;

Figure 5 is a side elevation of the attachment illustrated in Figure 4; and

Figure 6 is a longtitudinal cross-section on an enlarged scale of a fragmentary portion of the attachment illustrated in Figures 4 and 5 taken substantially on the line 6—6 of Figure 4.

With continued reference to the drawing, the camera illustrated is a commercial product and is believed to require no detailed description. It has a body portion 10 which encloses the film, film winding and shutter-operating mechanism, and which has a side-wall 11, a view finder 12, and a lens 13 carried in a lens mounting 14. An iris type diaphragm, not shown, is provided within the lens mounting and is operated by a diaphragm operating ring 15 which is carried upon the lens mounting 14 and is rotatable relative thereto to vary the size of the light stop opening for the lens.

Either the ring 15 or the lens mounting 14 is provided with a scale of indicia indicating the size of the diaphragm opening and the corresponding member is provided with an indicating mark for the scale. In order to fade a scene into the picture strip, the camera is started in operation with the diaphragm opening substantially closed and the opening is gradually opened to the desired maximum stop opening for the particular condition of light and location of the camera, and in fading a scene out of the picture strip this process is reversed, starting with the operative lens opening for the particular operating condition and gradually closing the lens stop to progressively darken the picture until the scene is faded out of the picture strip.

This operation can be conveniently accomplished with modern motion picture cameras of the amateur type by the provision of a diaphragm operating lever, generally indicated at 16. The lever 16 may conveniently comprise a substantially straight shank portion 17 of square or other desired cross-section having at its outer end a handle portion 18 disposed substantially at right angles to the shank portion. Where the diaphragm operating ring 15 is provided with angularly-spaced peripheral grooves or notches the lever may be conveniently attached to the ring by a resilient clamp comprising a pair of substantially semi-circular bands 19 which are preferably formed of thin, resilient metal.

Each of the bands 19 has at one end thereof a substantially straight ear 20 which lies along the corresponding side of the shank portion 17 and is apertured to receive suitable fastening means such as rivets 21 which extend through the inner-end of the shank portion and through the ears 20 to secure the bands 19 to the inner-end of the shank portion in opposed relation to each other. At its opposite end each band 19 is provided with an inwardly-turned hook 22, which hooks engage in peripheral grooves in the diaphragm operating ring 15 to secure the lever to the ring against rotation relative thereto. The handle portion 18 projects inwardly from the lens mounting, as is clearly illustrated in Figure 1, and lies along the side-wall 11 of the camera.

In applying the diaphragm controlling lever to the camera the ring 15 is adjusted to the proper diaphragm opening for the conditions under which the picture is to be taken. The lever 16 is then positioned with the clamp adjacent the ring 15 and the handle 18 contacting the side-wall 11 of the camera and the resilient clamp is then forced upon the ring 15. When so applied, contact of the handle 18 with the side-wall 11 of the camera will indicate the maximum desired lens opening and in order to fade the scene out of the picture it is only necessary to gradually move the handle 18 downwardly to the limit of the diaphragm closing movement of ring 15. To fade a scene into the picture, the handle is started from its lower position and gradually raised until it contacts the side-wall 11 at which time the proper lens opening will be provided for continued photographing of the scene.

Figures 4, 5 and 6 illustrate a diaphragm operating lever especially adapted for attachment to a diaphragm operating ring which is not provided with angularly-spaced peripheral grooves or serrations. In this case the substantially straight shank portion 23 is provided with a longitudinal opening extending therethrough and an annular band 24, preferably formed of thin, hard metal, is secured to the inner end of the shank portion, this band being preferably continuous and of a size to fit over the diaphragm operating rings of a reasonable range of different cameras with which it may be desired to use the device. A partly circular abutment member 25 is positioned within the band 24 and has a stem 26 extending into the opening provided in the shank portion 23 of the lever. A screw 27 having a knurled head is threadedly engaged in the outer-end portion of the shank portion 23 of the lever, and bears at its inner-end against the extension 26 to move the abutment member 25 inwardly of the band 24 to thereby securely clamp the lever in adjusted position on a diaphragm operating ring.

A handle member 28 extends from the outer-end of the shank portion 23 in the same manner as the handle 18 of the form of the device shown in Figures 1, 2 and 3.

The operating of the form of the device shown in Figures 4, 5 and 6 is otherwise the same as that of the form shown in Figures 1, 2 and 3, and described above.

The invention may be embodied in other specific forms without departing from the spirit or essential characteristics thereof. The present embodiments are, therefore, to be considered in all respect as illustrative and not restrictive, the scope of the invention being indicated by the appended claim rather than by the foregoing description, and all changes which come within the meaning and range of equivalency of the claim are, therefore, intended to be embraced therein.

What is claimed is:

An operating attachment for a camera lens diaphragm including a diaphragm operating ring, said attachment comprising an annular mounting ring for engagement over the diaphragm operating ring of the camera, said mounting ring having a radial opening, a substantially straight radial arm secured to the mounting ring adjacent to the radial opening thereof and having a longitudinally extending radial bore arranged in registration with the radial opening of the mounting ring, the radial bore of the radial arm terminating near and inwardly of the outer end of the radial arm, the outer end of the radial arm being provided with a relatively small screw threaded opening leading into the outer end of the radial bore, a substantially straight elongated radial stem slidably mounted within the radial bore of said radial arm, the inner end of said stem being adapted to project radially inwardly of the inner end of the radial arm and inside of said mounting ring, an arcuate shoe secured to the inner end of the radial stem and disposed bodily inwardly of the annular mounting ring and extending substantially parallel to the plane of the mounting ring, an adjusting screw mounted within the relatively small screw threaded opening and having its inner end engaging the outer end of the stem for adjusting the arcuate shoe radially into proper engagement with the periphery of said diaphragm operating ring, and a transverse extension secured to the outer end of the radial arm and arranged substantially at right angles thereto and extending substantially parallel to the axes of the diaphragm operating and mounting rings, said transverse extension projecting axially inwardly of the diaphragm operating ring of the camera and beyond the front face of the camera for contact with the adjacent side of the camera and serving as a stop to limit the swinging movement of the radial arm in one direction.

NICHOLAS POLANCO.

REFERENCES CITED

The following references are of record in the file of this patent:

UNITED STATES PATENTS

| Number | Name | Date |
|---|---|---|
| 437,655 | Lewis | Sept. 30, 1890 |
| 1,018,635 | Shukis | Feb. 27, 1912 |
| 1,228,389 | Barnes | June 5, 1917 |
| 1,520,185 | Johnson | Dec. 23, 1924 |
| 1,780,384 | Green | Nov. 4, 1930 |
| 2,196,097 | Brown | Apr. 2, 1940 |
| 2,198,454 | Mather | Apr. 23, 1940 |
| 2,241,596 | Guhl | May 13, 1941 |
| 2,319,398 | Gold | May 18, 1943 |
| 2,437,159 | Herbert | Mar. 2, 1948 |